(12) United States Patent
Joung et al.

(10) Patent No.: US 8,026,900 B2
(45) Date of Patent: Sep. 27, 2011

(54) OPTICAL MOUSE THAT DETECTS WORKING SURFACE USING CODE INCLUDED IN ILLUMINATED LIGHT AND CONTROL METHOD THEREOF

(75) Inventors: Chul-Yong Joung, Seoul (KR);
Duck-Young Jung, Yongin-si (KR);
Young-Ho Shin, Yongin-si (KR);
Bang-Won Lee, Yongin-si (KR)

(73) Assignee: Atlab Inc. (KR)

( * ) Notice: Subject to any disclaimer, the term of this patent is extended or adjusted under 35 U.S.C. 154(b) by 1256 days.

(21) Appl. No.: 11/224,349

(22) Filed: Sep. 12, 2005

(65) Prior Publication Data

US 2006/0055674 A1 Mar. 16, 2006

(30) Foreign Application Priority Data

Sep. 14, 2004 (KR) .................. 10-2004-0073545

(51) Int. Cl.
*G06F 3/033* (2006.01)
*G09G 5/08* (2006.01)
(52) U.S. Cl. ...................................... 345/166
(58) Field of Classification Search .................. 345/156, 345/857, 163–183; 382/312, 313
See application file for complete search history.

(56) References Cited

U.S. PATENT DOCUMENTS

| | | | |
|---|---|---|---|
| 4,408,105 A * | 10/1983 | Tanaka | 200/437 |
| 6,424,407 B1 * | 7/2002 | Kinrot et al. | 356/28 |
| 6,455,840 B1 * | 9/2002 | Oliver et al. | 250/222.1 |
| 6,750,846 B2 | 6/2004 | Rotzoll | |
| 6,847,356 B1 * | 1/2005 | Hasegawa et al. | 345/176 |
| 7,154,477 B1 * | 12/2006 | Hotelling et al. | 345/166 |
| 7,233,318 B1 * | 6/2007 | Farag et al. | 345/163 |
| 2002/0075386 A1 * | 6/2002 | Tanaka | 348/141 |
| 2002/0093486 A1 * | 7/2002 | Gordon et al. | 345/166 |
| 2003/0058222 A1 * | 3/2003 | Casebolt et al. | 345/163 |
| 2004/0135825 A1 * | 7/2004 | Brosnan | 345/857 |

(Continued)

FOREIGN PATENT DOCUMENTS

EP 1533686 A2 5/2005

(Continued)

OTHER PUBLICATIONS

Taiwanese Office Action; 09620122800; Mar. 8, 2007 with English Translation.

*Primary Examiner* — Chanh Nguyen
*Assistant Examiner* — Sanghyuk Park
(74) *Attorney, Agent, or Firm* — Cantor Colburn LLP

(57) ABSTRACT

An optical pointing device and a control method thereof are provided. The optical pointing device includes: an illumination unit for illuminating light on a working surface, and generating light in a predetermined code in response to a code signal; a control unit for detecting an image on the working surface to calculate a movement value, outputting movement information in response to an input signal inputted from the outside and the calculated movement value, intermittently outputting a code generation signal, and turning off the illumination unit when the optical pointing device is separated from the working surface in response to a determination signal; and a determination unit for outputting the code signal in response to the code generation signal, detecting light in the predetermined code to thus determine whether or not the optical pointing device is separated from the working surface, and outputting the determination signal depending on the determination result. Therefore, a glaring phenomenon generated when the optical pointing device is turned upside down can be prevented, and unnecessary power consumption can also be prevented.

12 Claims, 12 Drawing Sheets

U.S. PATENT DOCUMENTS

| | | | |
|---|---|---|---|
| 2004/0234107 A1* | 11/2004 | Machida et al. | 382/107 |
| 2005/0190157 A1* | 9/2005 | Oliver et al. | 345/166 |
| 2005/0264534 A1* | 12/2005 | Lee | 345/166 |
| 2006/0132443 A1* | 6/2006 | Chien Wu | 345/166 |

FOREIGN PATENT DOCUMENTS

| | | |
|---|---|---|
| TW | 574666 | 2/2004 |
| TW | 1227007 | 1/2005 |
| TW | 1227008 | 1/2005 |

\* cited by examiner

FIG. 3
(PRIOR ART)
(a)
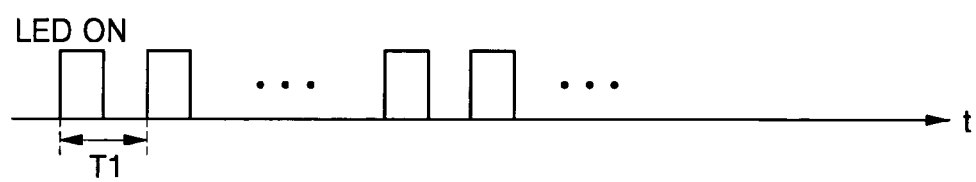
(b)
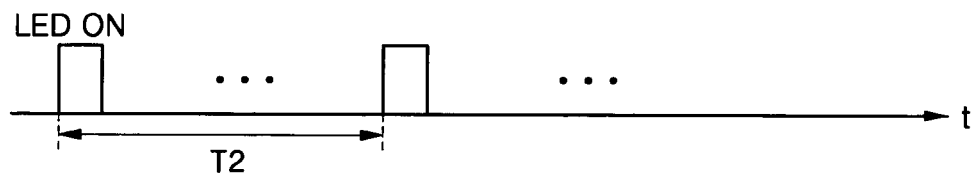

FIG. 7
(a)
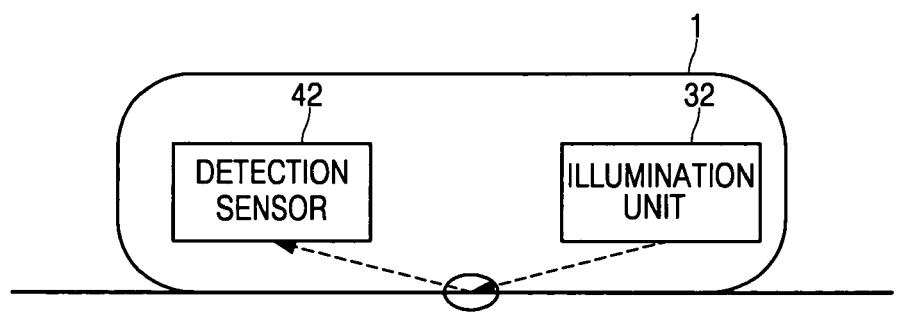
(b)
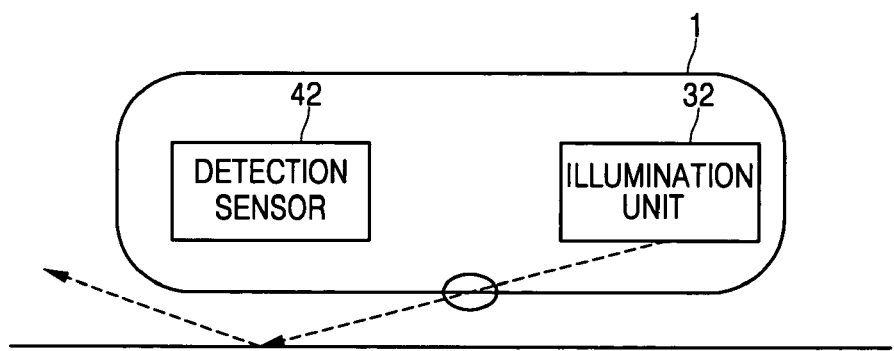

FIG. 9
(a)
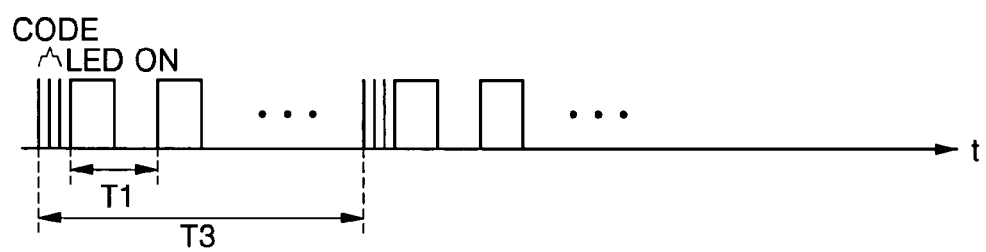
(b)
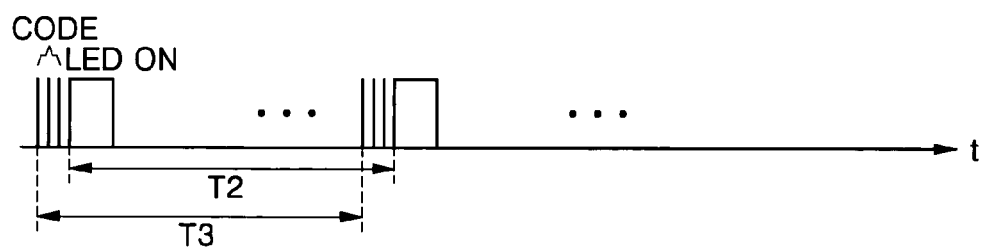
(c)
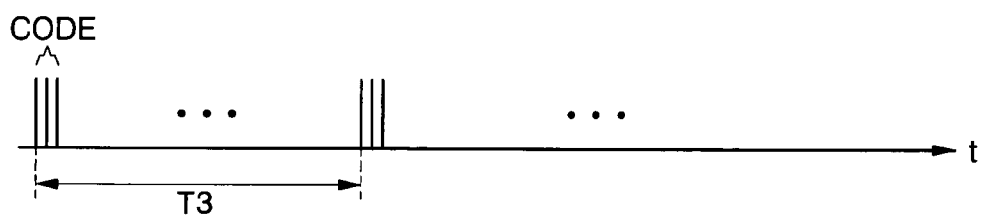

OPTICAL MOUSE THAT DETECTS WORKING SURFACE USING CODE INCLUDED IN ILLUMINATED LIGHT AND CONTROL METHOD THEREOF

CROSS-REFERENCE TO RELATED APPLICATION

This application claims the priority of Korean Patent Application No. 2004-73545, filed Sep. 14, 2004, the disclosure of which is incorporated herein in its entirety by reference.

BACKGROUND OF THE INVENTION

1. Field of the Invention

The present invention relates to an optical pointing device, and more specifically, to an optical pointing device and control method thereof capable of preventing light from glaring out from an illumination unit when the optical pointing device is separated from working surface.

2. Description of the Related Art

An optical mouse is a peripheral input/output device of a computer that radiates light onto a surface across which it moves and receives light reflected from the surface to output movement information of the optical mouse. In general, the optical mouse is used on top of a flat working surface facing downward so that light radiated from the optical mouse is not directly visible to a user, but when the optical mouse is turned upside down, light output from the optical mouse is directly visible to the user and a glaring phenomenon may occur.

FIG. 1 is a block diagram of a conventional optical mouse, including a control unit 10, an input unit 20, and an illumination unit 30. The control unit 10 includes an image information output unit 11 including an image sensor 11-1 and a converter 11-2, a movement value calculation unit 12, and a communication unit 13. A lens of FIG. 1 refers to an optical structure that transmits light reflected from the working surface under the mouse to the image sensor. In addition, a dotted line of FIG. 1 indicates a direction in which light radiated from the illumination unit 30 is inputted to the image sensor 11-1.

A function of each block shown in FIG. 1 will be described below.

The control unit 10 detects an image on the working surface to calculate a movement value, receives signals from the input unit 20, and outputs of the calculated movement value and the input unit signals to an external device such as a computer.

The image information output unit 11 detects the image on the working surface and outputs image information on the detected image. The image sensor 11-1 receives light reflected from the working surface through the lens to detect image data and output an analog signal corresponding to the detected image data. The converter 11-2 converts the analog signal of the image sensor 11-1 into image information that is digital data and outputs the converted information.

The movement value calculation unit 12 calculates and outputs the movement value using the image information inputted from the converter 11-2 and outputs a control signal for controlling the illumination unit 30 in response to a state of the optical mouse 1 and a signal inputted from the communication unit 13.

The communication unit 13 receives signals corresponding to information inputted through the input unit 20 (e.g., an operation state of a button or a movement of a scroll device) and outputs the input unit signals and signals from an external device such as a computer to the movement value calculation unit 12, and outputs the movement information and the input unit signals to the external device such as a computer in response to the movement value inputted from the movement value calculation unit 12 and the input signal inputted from the input unit 20. The input unit 20, which may include buttons or scroll devices, outputs the input signal in response to manipulation by a user. The illumination unit 30 turns on or off in response to an illumination signal inputted from the movement value calculation unit 12 and radiates light onto the working surface when turned on. The illumination unit 30, which is used as a light source, may include a light emitting diode and a driving circuit to turn on or off the light emitting diode.

FIG. 2 is a state diagram for explaining operation of the conventional optical mouse shown in FIG. 1. Operation of the conventional optical mouse shown in FIG. 1 will be described below with reference to FIG. 2.

The conventional optical mouse has an active state in which the illumination unit 30 is turned on for most of the time and a movement value is calculated depending on the operation state of the optical mouse, an inactive state in which the light source is turned off for most of the time and turned on periodically to determine whether or not the optical mouse moves, and an idle state in which the light source remains in the off state.

As long as the optical mouse moves in the active state, it remains the active state (S1). However, when there is no movement of the optical mouse for a predetermined time in the active state, the optical mouse converts into the inactive state (S2). When there is no movement of the optical mouse in the inactive state, the optical mouse remains in the inactive state (S3). However, when movement of the optical mouse is detected, the optical mouse converts into the active state (S4). When there is no movement of the optical mouse for a predetermined time in the inactive state, the optical mouse converts into the idle state (S5). In the idle state, movement of the optical mouse is not detected, however when the input signal is generated by manipulation of the input unit, such as buttons, i.e., the input unit 20, the optical mouse converts into the active state (S6).

FIG. 3 is a diagram for explaining a method of controlling the illumination unit 30 in the conventional mouse shown in FIG. 1, in which FIGS. 3A and 3B show methods of controlling the illumination unit 30 in an active unit and in an inactive unit, respectively.

A method of controlling the illumination unit 30 in the conventional optical mouse will be described below with reference to FIG. 3.

In the active state (FIG. 3A), the illumination unit 30 turns on periodically with a predetermined first period T1. In the inactive state (FIG. 3B), the illumination unit 30 turns on periodically with a predetermined second period T2. The second period T2 is set to be longer than the first period T1.

In other words, the optical mouse calculates the movement value while turning the light source on relatively frequently in the active state (FIG. 3A), and determines whether or not the optical mouse moves while turning on the optical mouse relatively infrequently in the inactive state (FIG. 3B).

However, for the conventional optical mouse shown in FIG. 1, while the optical mouse is in the active state (FIG. 3A) or the inactive state (FIG. 3B), when the user turns the optical mouse upside down, light may glare out from the illumination unit 30. In addition, since the illumination unit 30 is unnecessarily turned on, power is unnecessarily consumed.

FIG. 4 is a block diagram of an embodiment of a conventional optical mouse with which the glaring phenomenon can be prevented, including a control unit 10, an input unit 20, an illumination unit 31, and a detection unit 40. The control unit 10 includes an information output unit 11 including an image sensor 11-1 and a converter 11-2, a movement value calculation unit 12, and a communication unit 13, and the detection unit 40 includes a sensor and a light emitting diode (LED). In FIG. 4, a dotted line indicates a direction in which light radiated from the illumination unit 31 is inputted to the image sensor 11-1.

A function of each block shown in FIG. 4 will be described below.

Functions of the control unit 10 and the input unit 20 are the same as described in FIG. 1.

The detection unit 40 radiates light using the light emitting diode (LED) and detects the light using the sensor to determine whether or not the optical mouse is separated from the working surface, and outputs a detection signal depending on the determination result. In other words, when the optical mouse is on the working surface, light radiated from the light emitting diode (LED) is reflected and detected with the sensor, and when the optical mouse is separated from the working surface, light radiated from the light emitting diode (LED) is not detected. Therefore, whether or not the optical mouse is separated from the working surface can be determined by whether or not light is detected with the sensor.

The illumination unit 31 turns on or off in response to the illumination signal inputted from the movement value calculation unit 12 of the control unit 10 and the detection signal inputted from the detection unit 40.

FIG. 5 is a block diagram for explaining operation of the illumination unit 31 of the conventional optical mouse shown in FIG. 4, including a resistor R1, a light emitting diode (LED), and two driving circuits DR1 and DR2 which may include a resistor R2 and a transistor TR1 and a resistor R3 and a transistor TR2, respectively.

A function and operation of each block shown in FIG. 5 is described below.

The driving circuits DR1 and DR2 turn on or off, respectively, in response to an illumination signal inputted from the movement value calculation unit 12 or a detection signal inputted from the sensor of the detection unit 40, to thus turn the light emitting diode (LED) on or off. The two driving circuits DR1 and DR2 are connected in series so that if one of them turns off, the light emitting diode (LED) turns off.

In other words, when the optical mouse is on the working surface, the sensor of the detection unit 40 outputs the detection signal with a high level, to thus turn on the driving circuit DR2. The light emitting diode LED then turns on or off in response to the illumination signal inputted from the movement value calculation unit 12. However, when the optical mouse is separated from the working surface, the sensor of the detection unit 40 outputs a detection signal with a low level, to thus turn off the driving circuit DR2. The light emitting diode (LED) then turns off, irrespective of operation of the movement value calculation unit 12.

However, for the conventional optical mouse shown in FIG. 4, if the optical mouse is turned upside down and light which is not radiated from the light emitting diode (LED) is inputted from the outside of the optical mouse to the sensor, it can be mistakenly determined that the optical mouse is on the working surface. In addition, since a separate light emitting diode (LED) is added to the detection unit 40 together with the illumination unit 31 for the control unit 10, power consumption is increased and extra parts are required. In addition, with two driving circuits as shown in FIG. 5, cost is further increased and a circuit is complicated.

SUMMARY OF THE INVENTION

It is, therefore, an object of the present invention to provide an optical pointing device capable of preventing a glaring phenomenon that may occur when the optical pointing device is separated from a working surface.

It is another object of the present invention to provide a method of controlling the optical pointing device.

In an exemplary embodiment according to the present invention, an optical pointing device includes: an illumination unit for illuminating light on a working surface, and generating light in a predetermined code in response to a code signal; a control unit for detecting an image on the working surface to calculate a movement value, outputting movement information in response to an input signal inputted from the outside and the calculated movement value, intermittently outputting a code generation signal, and turning off the illumination unit when the optical mouse is separated from the working surface in response to a determination signal; and a determination unit for outputting the code signal in response to the code generation signal, detecting light in the predetermined code to thus determine whether or not the optical mouse is separated from the working surface, and outputting the determination signal depending on a determination result.

In the optical pointing device according to the exemplary embodiment of the present invention, the control unit may include: an image information output unit for detecting an image on the working surface, and outputting image information on the detected image; a movement value calculation unit for calculating a movement value from the image information, intermittently outputting the code generation signal, and turning off the illumination unit when the optical pointing device is separated from the working surface in response to the determination signal; and a communication unit for outputting the movement information in response to the calculated movement value and the input signal.

In the optical pointing device according to the exemplary embodiment of the present invention, the determination unit may include: a code generator for outputting the code signal to turn on or off the illumination unit in response to the code generation signal; a detection sensor for receiving light generated from the illumination unit to thus output a detection signal; and a code interpreter for interpreting the detection signal to determine whether or not the optical pointing device is on the working surface, and outputting the determination signal depending on the determination result.

In the optical pointing device according to the exemplary embodiment of the present invention, the code generator may output the code signal to turn on the illumination unit for a short time enough for a visually very weak signal to be detected.

In the optical pointing device according to the exemplary embodiment of the present invention, the code generator may output the code signal to repetitively turn on or off the illumination unit depending on a certain code value.

In the optical pointing device according to the exemplary embodiment of the present invention, the code generator outputs the code signal to turn on the illumination unit for a visually very weak signal to be detected and the code signal is a pulse signal and a duty cycle of the pulse signal is larger than 50% or smaller than 50%.

In the optical pointing device according to the exemplary embodiment of the present invention, the control unit may have an active state in which the movement value is calculated while the illumination unit remains on for most of the time, and the code generation signal is intermittently output, an inactive state in which a determination is made whether or not the pointing device moves by intermittently turning on the illumination unit while the illumination unit remains off for most of the time, and the code generation signal is intermittently output, and a glaring prevention state in which the code generation signal is intermittently output while the illumination unit remains off for most of the time; and the control pointing device may serve to convert the active state or the inactive state into the glaring prevention state when the determination is made that the optical pointing device is separated from the working surface.

In the optical pointing device according to the exemplary embodiment of the present invention, the control unit may further have an idle state in which the illumination unit remains off; and the control unit may further serve to convert into the idle state when the glaring prevention state continues for a predetermined time.

In another exemplary embodiment according to the present invention, an optical pointing device includes: an illumination unit for illuminating light on a working surface; a detection unit for determining whether or not the optical pointing device is on the working surface to thus output a detection signal; and a control unit for detecting an image on the working surface to calculate a movement value, outputting movement value in response to an input signal inputted from the outside and the calculated movement value, and turning off the illumination unit when the optical pointing device is separated from the working surface in response to the detection signal.

In the optical pointing device according to another exemplary embodiment of the present invention, the control unit may include an image information output unit for detecting an image on the working surface, and outputting image information on the detected image; a movement value calculation unit for calculating a movement value from the image information, and turning off the illumination unit when the optical pointing device is separated from the working surface in response to the detection signal; and a communication unit for outputting the movement information in response to the calculated movement value and the input signal.

In the optical pointing device according to another exemplary embodiment of the present invention, the detection unit may include a push button protruded at a bottom side of the optical pointing device.

In the optical pointing device according to another exemplary embodiment of the present invention, the optical pointing device may include a plurality of push buttons.

In the optical pointing device according to another exemplary embodiment of the present invention, the detection unit may include a bottom cover arranged at the bottom side of the optical pointing device and having a contact point with a main body of the optical pointing device; an upper cover arranged at the upper side of the optical pointing device and having a contact point with the main body of the optical pointing device; and a gate for causing the detection signal to be inactive when the contact point of the upper cover or the contact point of the bottom cover comes off.

In the optical pointing device according to another exemplary embodiment of the present invention, the detection unit may include a light emitting diode for illuminating light on the working surface; and a sensor for detecting the light reflected from the working surface to thus output the detection signal.

In yet another exemplary embodiment according to the present invention, a method of controlling an optical pointing device includes: a code generation step that turns on or off an illumination unit in response to a code signal; a determination step that detects light output from the illumination unit to analyzes a code included in the light, to thus determine whether or not the optical pointing device is separated from the working surface, and outputs a determination signal depending on a determination result; and a glaring prevention step that turns off the illumination unit when the optical pointing device is separated from the working surface in response to the determination signal.

In the optical pointing device control method according to yet another exemplary embodiment according to the present invention, the code generation step may turn on the illumination unit for a short time enough for a visually very weak signal to be detected.

In the optical pointing device control method according to yet another exemplary embodiment according to the present invention, the determination step may include: a detection step that receives light generated from the illumination unit to output a detection signal; and an interpretation step that interprets the detection signal to determine whether or not the optical pointing device is on the working surface, and outputs the determination signal depending on a determination result.

In the optical pointing device control method according to yet another exemplary embodiment according to the present invention, the glaring prevention step may convert into an active state in which the movement value is calculated while the illumination unit remains on for most of the time, and the code generation signal is intermittently output, or into an inactive state in which a determination is made whether or not the pointing device moves by intermittently turning on the illumination unit while the illumination unit remains off for most of the time, and the code generation signal is intermittently output, into a glaring prevention state in which the code generation signal is intermittently output while the illumination unit remains off for most of the time, when the optical pointing device is separated from the working surface.

In the optical pointing device control method according to yet another exemplary embodiment according to the present invention, the glaring prevention step may further include converting into an idle state in which the illumination unit remains off when the glaring prevention state continues for a predetermined time.

BRIEF DESCRIPTION OF THE DRAWINGS

The above and other features of the present invention will become more apparent to those of ordinary skill in the art by describing in detail preferred embodiments thereof with reference to the attached drawings in which:

FIG. 3 is a diagram for explaining a method of controlling an illumination unit in the conventional optical mouse;

FIG. 7 is a diagram for explaining a method of determining whether or not the optical mouse is on the working surface, for the optical mouse of the present invention shown in FIG. 6;

FIG. 9 is a diagram for explaining a method of controlling an illumination unit in the optical mouse of the present invention shown in FIG. 6;

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

An optical pointing device and a control method thereof according to the present invention will now be described with reference to the accompanying drawings.

Figure 6:
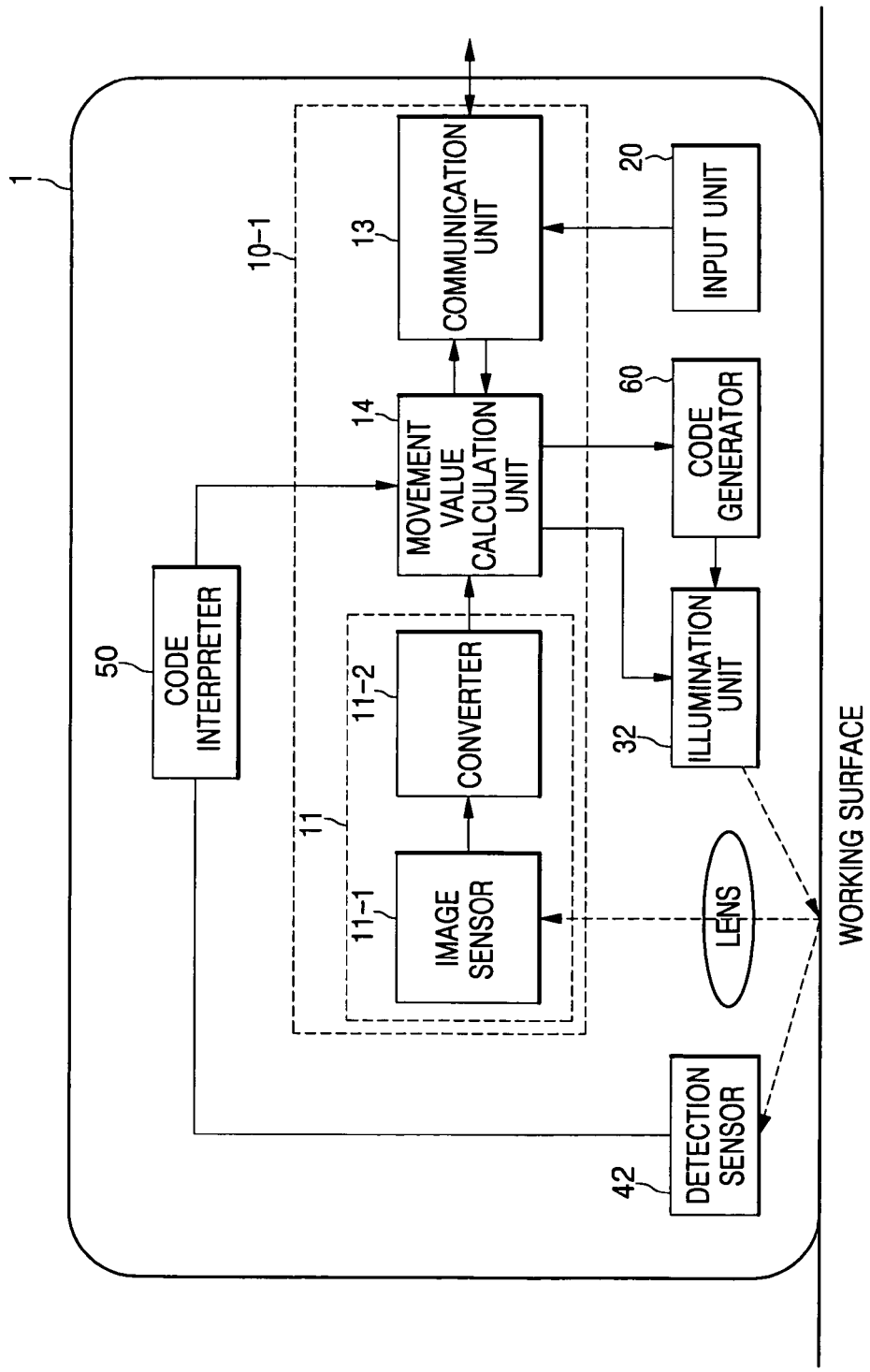
FIG. 6 is a block diagram of an optical mouse according to a first embodiment of the present invention.

FIG. 6 is a block diagram of an optical mouse according to a first embodiment of the present invention, including a control unit 10-1, an input unit 20, an illumination unit 32, a detection sensor 42, a code interpreter 50, and a code generator 60, and the control unit 10-1 includes an image information output unit 11 including an image sensor 11-1 and a converter 11-2, a movement value calculation unit 14, and a communication unit 13. In FIG. 6 a lens indicates an optical structure that passes through light reflected from a working surface, and a dotted line indicates a direction in which light radiated from the illumination unit 32 is inputted to the image sensor 11-1 and detection sensor 42.

A function of each block shown in FIG. 6 will be described below.

Figure 1:
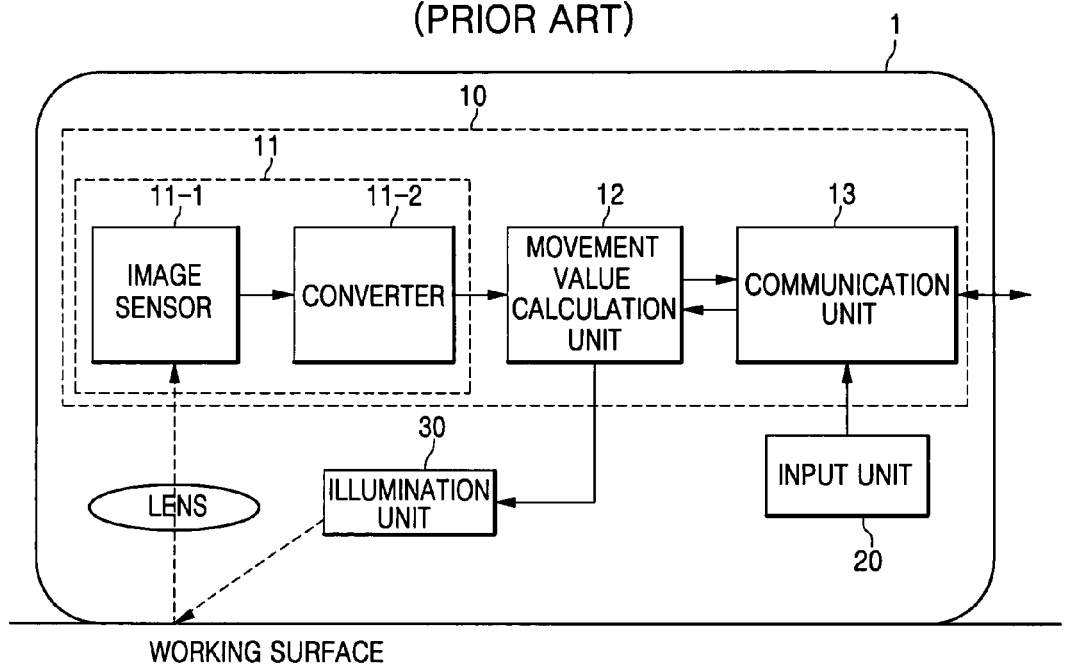
FIG. 1 is a block diagram of a conventional optical mouse.
Figure 2:
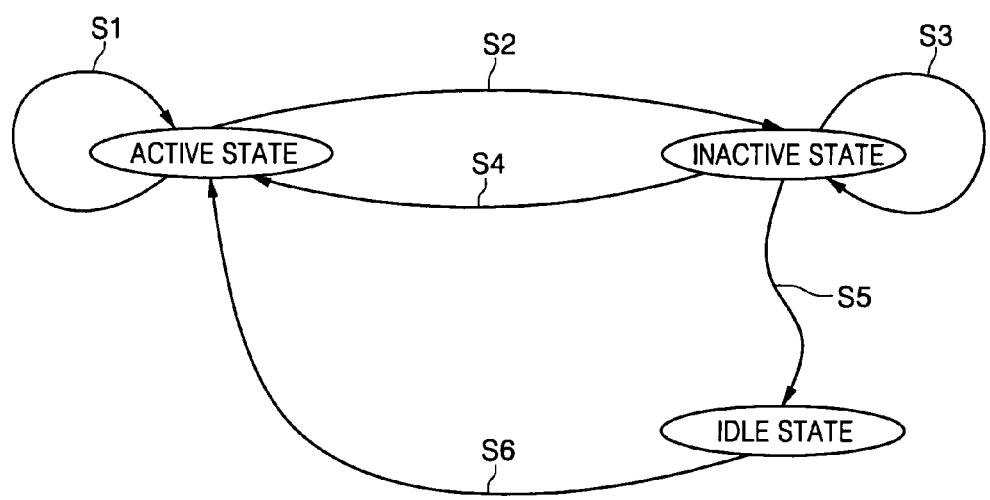
FIG. 2 is a state diagram for explaining operation of the conventional optical mouse shown in FIG. 1.

Functions of the image information output unit 11, the communication unit 13, and the input unit 20 are the same as those described in FIG. 1.

The movement value calculation unit 14 calculates a movement value using digital data inputted from the converter 11-2, and outputs an illumination signal to control the illumination unit 32 in response to a state of the optical mouse 1, a signal inputted from the communication unit 13, and a determination signal inputted from the code interpreter 50. In addition, the movement value calculation unit 14 outputs a code generation signal to control the code generator 60.

The illumination unit 32 turns on or off in response to the illumination signal inputted from the movement value calculation unit 14 and the code signal inputted from the code generator 60. The code generator 60 outputs a code signal to turn the illumination unit 32 on or off, in response to the code generation signal inputted from the movement value calculation unit 14. The code signal is a pulse signal, and the illumination unit 32 is turned on when the pulse signal is a "high" level, on the other hand, the illumination unit 32 is turned off when the pulse signal is a "low" level. Further, if the duty cycle of the code signal which is the pulse is larger than 50%, the turn-on time of the illumination unit 32 is longer than the turn-off time of the illumination unit 32, on the other is hand, if the duty cycle of the code signal which is the pulse signal is smaller than 50%, the turn-off time of the illumination unit 32 is longer than the turn-on time of the illumination unit 32. That is, the turn-on time and the turn-off time of the illumination unit 32 can be varied according to the variation of the duty cycle of the code signal. The detection sensor 42 detects light radiated from the illumination unit 32 to output the detection signal. The code interpreter 50 interprets a detection signal inputted from the detection sensor 42 to determine whether or not the optical mouse is on the working surface, and outputs a determination signal depending on the determination result.

In other words, the optical mouse 1 of the present invention shown in FIG. 6 repetitively turns the illumination unit 32 on or off depending on a specific code using the code generator 60, detects this through the detection sensor 42, determines using the code interpreter 50 whether the code detected by the detection sensor 42 matches a code output using the code generator 60, and thus determines whether or not the optical mouse is on the working surface.

While FIG. 6 illustrates that the determination signal output from the code interpreter 50 is inputted to the movement value calculation unit 14, the determination signal may be inputted to the communication unit 13. In this case, the communication unit 13 outputs the signal in response to the determination signal, and the movement value calculation unit 14 outputs a control signal to turn the illumination unit 32 on or off in response to the signal inputted from the communication unit 13.

In addition, while FIG. 6 illustrates that the movement value calculation unit 14 outputs the illumination signal to control the illumination unit 32, the communication unit 13 may output the illumination signal. In the same manner, the code generation signal may also be output from the communication unit 13.

In other words, the control unit 10-1 of the optical mouse 1 of the present invention shown in FIG. 6 calculates and outputs the movement value of the optical mouse using the image sensor 11-1, the converter 11-2, the movement value calculation unit 14, and the communication unit 13, and at the same time, and outputs the code generation signal intermittently, turns off the illumination unit 32 when the optical mouse 1 is separated from the working surface in response to the determination signal output from the code interpreter 50, so that it is possible to prevent a glaring phenomenon.

FIG. 7 is a diagram for explaining a method of determining whether or not the optical mouse is on the working surface, for the optical mouse of the present invention shown in FIG. 6, in which FIG. 7A shows a case where the optical mouse is on the working surface and FIG. 7B shows a case where the optical mouse is separated from the working surface.

A method of determining whether or not the optical mouse is on the working surface, for the optical mouse of the present invention, will be described below with reference to FIG. 7.

As shown in FIG. 7A, when the optical mouse is on the working surface, light radiated from the illumination unit 32 is reflected on the working surface, and detected through the detecting sensor 42. However, as shown in FIG. 7B, when the optical mouse 1 is separated from the working surface, light radiated from the illumination unit 32 is not detected through the detection sensor 42. Therefore, by turning the illumination unit 32 on or off such that light radiated from the illumination unit 32 has a certain code, and interpreting light detected through the detection sensor 42, a determination can be made as to whether the optical mouse 1 is on the working surface.

Figure 4:
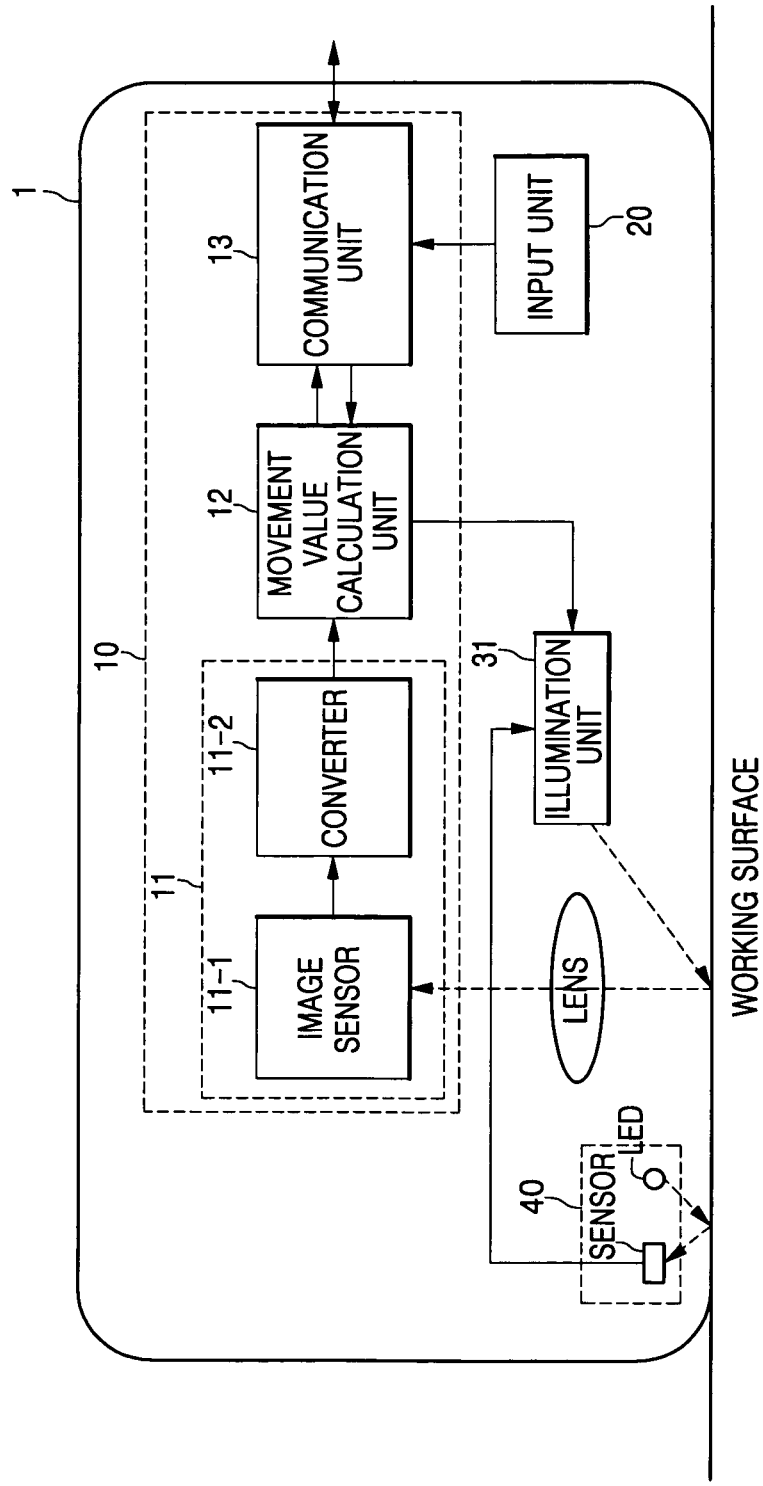
FIG. 4 is a block diagram of the conventional optical mouse capable of preventing a glaring phenomenon.

In other words, compared with the conventional optical mouse shown in FIG. 4, for the conventional optical mouse, when light is inputted from the outside, and the sensor of the detection unit 40 detects this, a determination can be erroneously made that the optical mouse is on the working surface. However, the optical mouse of the present invention shown in FIG. 6 radiates light having a certain code using the illumination unit 32, and interprets light detected by the detection sensor 42 to thus determine whether the optical mouse is on the working surface, so that even when light is inputted from the outside, a determination can be exactly made as to whether the optical mouse is separated from the working surface.

Figure 8:
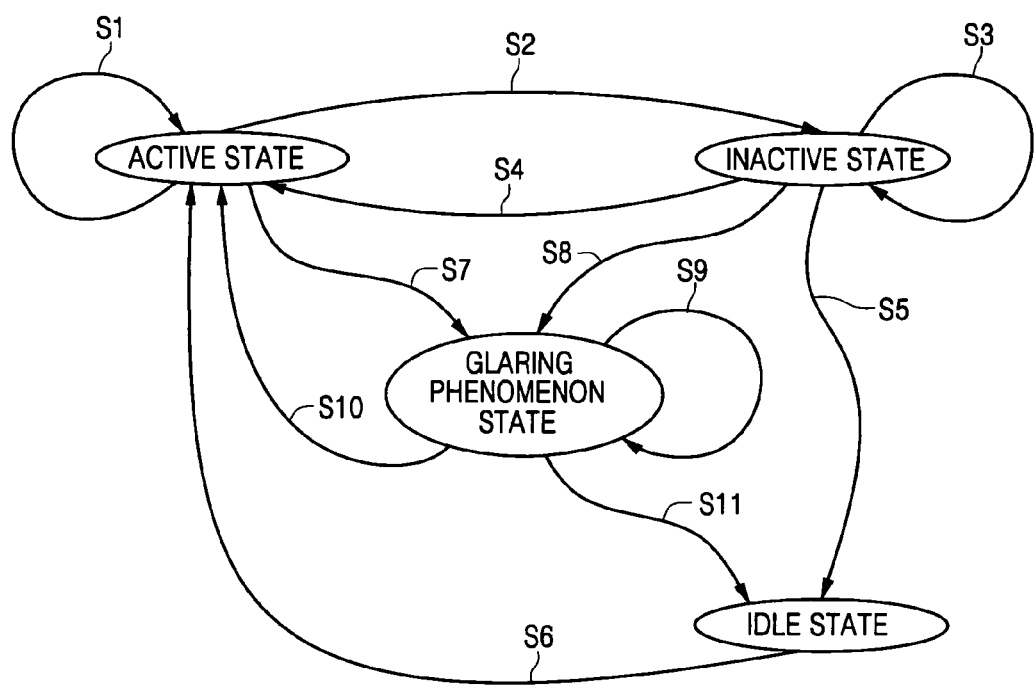
FIG. 8 is a state diagram for explaining operation of the optical mouse of the present invention shown in FIG. 6.

FIG. 8 is a state diagram for explaining operation of the optical mouse of the present invention shown in FIG. 6, and thus the operation of the optical mouse of the present invention will be described below with reference to FIG. 8.

The optical mouse of the present invention has an active state in which the movement value is calculated depending on the operation state of the optical mouse while the illumination unit 32 turns on for most of the time, an inactive state in which the determination is made as to whether the optical mouse moves while the illumination unit 32 turns off for most of the time and periodically turns on, and a glaring prevention state and an idle state in which the illumination unit 32 remains undetectably off and completely off state, respectively. The optical mouse turns the illumination unit 32 on or off to output a certain code in the active, inactive, and glaring prevention states, and detects this to determine whether the optical mouse is on the working surface.

When the optical mouse moves in the active state, the optical mouse remains the active state (S1). However, when there is no movement of the optical mouse for a predetermined time in the active state, the optical mouse converts into the inactive state (S2). In addition, when the optical mouse is separated from the working surface in the active state, the optical mouse converts into the glaring prevention state (S7).

When there is no movement of the optical mouse in the inactive state, the optical mouse remains the inactive state (S3). However, when the movement of the optical mouse is detected, the optical mouse converts into the active state (S4). When there is no movement of the optical mouse for a predetermined time in the inactive state as well, the optical mouse converts into the idle state (S5). In addition, when the optical mouse is separated from the working surface in the inactive state, the optical mouse converts into the glaring prevention state (S8).

When a determination is made that the optical mouse is on the working surface in the glaring prevention state, the optical mouse converts into the active state (S10). However, when a determination is made that the optical mouse is separated from the working surface, the optical mouse remains the glaring prevention state (S9). When the optical mouse is separated from the working surface for a predetermined time in the glaring prevention state as well, i.e., when the glaring prevention state continues for a predetermined time, the optical mouse converts into the idle state (S11).

In the idle state, the movement of the optical mouse is not detected, and the optical mouse converts into the active state by control of the input unit 20 such as buttons (S6).

FIG. 9 is a diagram for explaining a method of controlling the illumination unit 32 in the optical mouse of the present invention, in which FIG. 9A illustrates a method of controlling the illumination unit 32 in the active state, FIG. 9B the inactive state, and FIG. 9C in the glaring prevention state, respectively.

A method of controlling the illumination unit 32 in the optical mouse of the present invention will be described with reference to FIG. 9.

In the active state (FIG. 9A), the illumination unit 32 turns on periodically with a predetermined first period T1, and in addition, the illumination unit 32 turns on or off periodically depending on a predetermined third period T3 to generate a code, in order to determine whether the optical mouse is on the working surface.

In the inactive state (FIG. 9B), the illumination unit 32 turns on periodically with a predetermined second period T2, and in addition, the illumination unit 32 turns on or off periodically depending on a predetermined third period T3 to generate a code, in order to determine whether the optical mouse is on the working surface. The second period T2 is set to be longer than the first period T1.

In the glaring prevention state (FIG. 9C), while the illumination unit 32 remains the off state basically, the optical mouse turns the illumination unit 32 on or off periodically depending on the predetermined third period T3 to generate a code, in order to determine whether the optical mouse is on the working surface.

Turning the illumination unit 32 on or off to generate a code indicates that the illumination unit 32 turns on or off depending on a certain code. At this time, when the illumination unit 32 turns on, a time for the illumination unit 32 to turn on is set to be short enough, i.e., the illumination unit 32 turns on for a short time enough for visually very weak light to be detected, so that the glaring phenomenon can be minimized or prevented.

While it is illustrated that the periods T3 in which the code is generated are the same in the active, inactive, and glaring prevention states, the periods may be set to be different from each other.

In other words, the optical mouse of the present invention generates a code periodically using the illumination unit 32 in the active state (FIG. 9A) and the inactive state (FIG. 9B), and thus determines whether the optical mouse is on the working surface, and converts into the glaring prevention state (FIG. 9C) when a determination is made that the optical mouse is separated from the working surface. In the glaring prevention state (FIG. 9C), while turning the illumination unit 32 off basically, the optical mouse generates a code using the illumination unit 32, so that a determination is made as to whether the optical mouse is on the working surface. When the code is generated, the illumination unit 32 turns on for a short time enough for a user to detect visually very weak light, so that the glaring phenomenon can be prevented when the optical mouse is turned upside down. In addition, power consumption can also be minimized.

Figure 10:
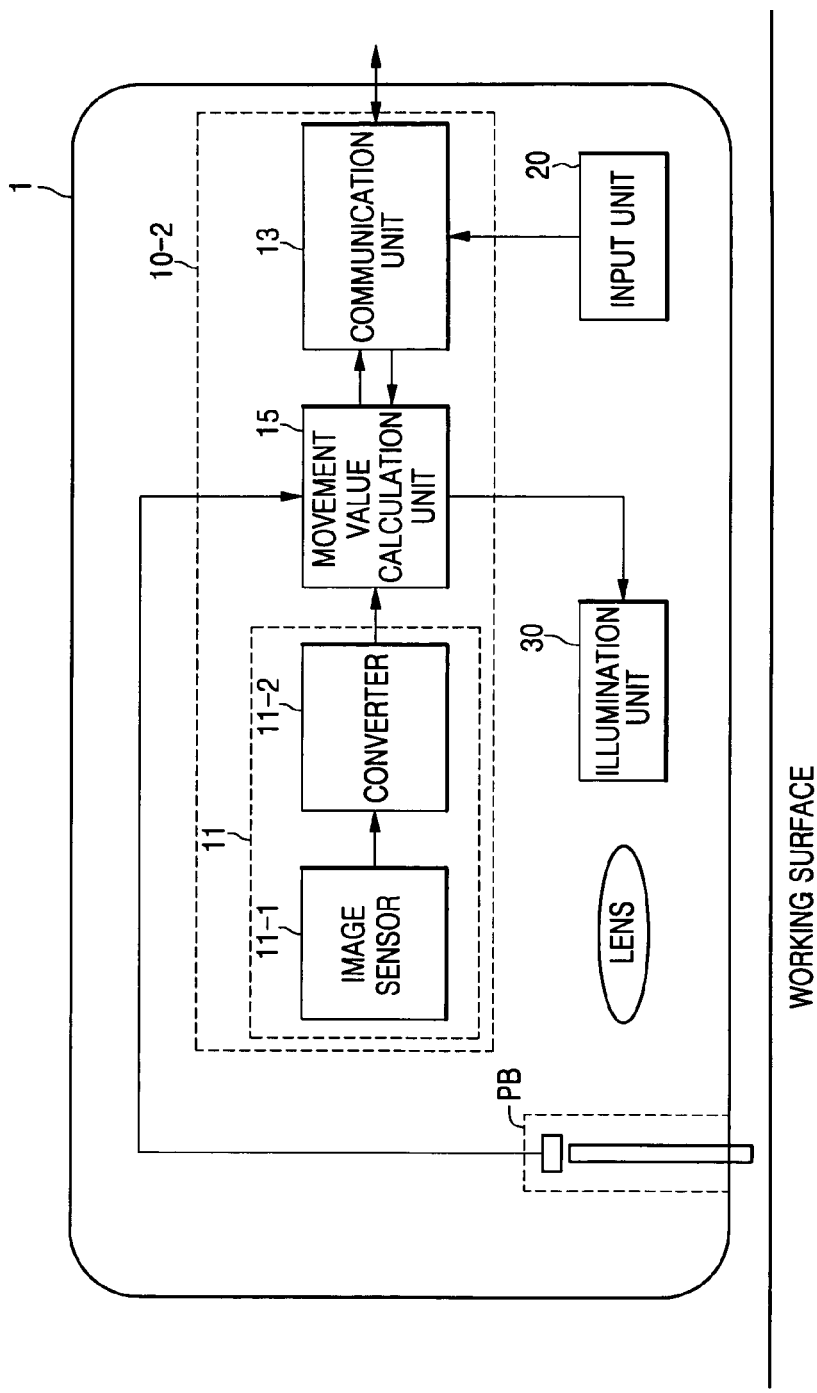
FIG. 10 is a block diagram of an optical mouse according to a second embodiment of the present invention.

FIG. 10 is a block diagram showing a block diagram of an optical mouse according to a second embodiment of the present invention, including a control unit 10-2, an input unit 20, an illumination unit 30 and a push button (PB), and the control unit 10-2 includes an image information output unit 11 including an image sensor 11-1 and a converter 11-2, a movement value calculation unit 15, and a communication unit 13. In FIG. 10, a lens refers to an optical structure that passes light reflected from the working surface to the image sensor 11-1.

A function of each block shown in FIG. 10 will be described below.

Functions of the image information output unit 11, the communication unit 13, the input unit 20 and the illumination unit 30 are the same as those described in FIG. 1.

The movement value calculation unit 15 calculates and outputs the movement value using image information inputted from the converter 11-2, and outputs an illumination signal to control the illumination unit 30 in response to a state of the optical mouse 1, a detection signal inputted from the push button (PB), and a signal inputted from the communication unit 13.

The push button PB outputs the detection signal depending on whether the optical mouse 1 is on the working surface. In other words, when the optical mouse 1 is on the working surface, the push button PB also remains a contact state, and when the optical mouse 1 is separated from the working surface, the push button PB also become an off state. Using this, a determination can be made as to whether the optical mouse 1 is on the working surface, and the detection signal is output depending on a determination result.

In other words, the optical mouse according to the second embodiment of the present invention shown in FIG. 10 determines whether the optical mouse is separated from the working surface depending on whether the push button PB contacts or not, and when the optical mouse is separated from the working surface, the illumination 30 turns off, so that the glaring phenomenon generated when the optical mouse is turned upside down can be prevented.

Figure 11:
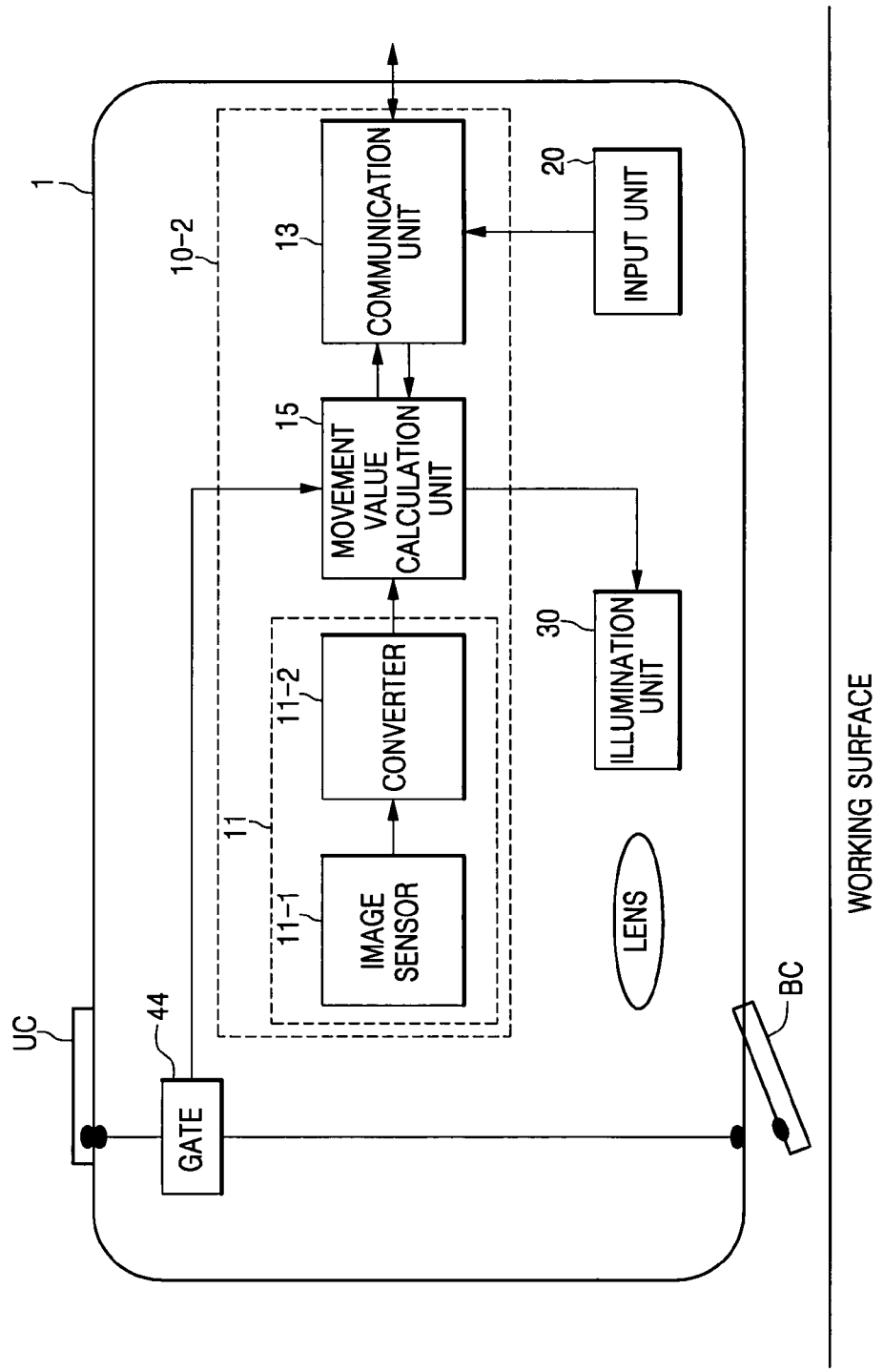
FIG. 11 is a block diagram of an optical mouse according to a third embodiment of the present invention.

FIG. 11 is a block diagram showing a block diagram of an optical mouse according to a third embodiment of the present invention, including a control unit 10-2, an input unit 20, an illumination unit 30 and an upper cover UC, a bottom cover BC, and a gate 44, and the control unit 10-2 includes an image information output unit 11 including an image sensor 11-1 and a converter 11-2, a movement value calculation unit 15, and a communication unit 13. In FIG. 11, a lens refers to an optical structure that passes light reflected from the working surface to the image sensor 11-1.

A function of each block shown in FIG. 11 will be described below.

Functions of the image information output unit 11, the communication unit 13, the input unit 20 and the illumination unit 30 are the same as those described in FIG. 1, and a function of the movement value calculation unit 15 is the same as that described in FIG. 10.

When the optical mouse 1 is turned upside down, the upper cover UC is off from a main body of the optical mouse 1, and when the optical mouse 1 is separated from the working surface, the bottom cover BC is off from the main body of the optical mouse 1. The gate 44 outputs the detection signal depending on whether the upper cover UC or the bottom cover BC is off from the main body of the optical mouse 1.

In other words, the optical mouse according to the third embodiment of the present invention shown in FIG. 11 is separated from the working surface when one of the upper cover UC or the bottom cover BC is off from the main body of the optical mouse. Therefore, using the gate 44, a determination is made as to whether one of the upper cover UC or the bottom cover BC is off from the main body of the optical mouse 1, and outputs the detection signal depending on the determination result, so that a determination can be made that the optical mouse is separated from the working surface. Thus, when the optical mouse is separated from the working surface, the illumination unit 30 turns off, so that the glaring phenomenon generated when the optical mouse is turned upside down can be prevented.

While FIGS. 10 and 11 illustrate that the detection signal output from the push button PB or the gate 44 is inputted to the movement value calculation unit 15, it may be inputted to the communication unit 13. In this case, the communication unit 13 is arranged to inform the movement value calculation unit 15, in response to the detection signal, whether or not the optical mouse is separated from the working surface.

In addition, the communication unit 13 may output an illumination signal to turn the illumination unit 30 on or off directly. In this case, information on whether or not the optical mouse 1 is separated from the working surface can be inputted from the movement value calculation unit 15, and the detection signal may directly inputted from the push button PB or the gate 44.

In addition, In FIGS. 10 and 11, the detection signal output from the push button PB or the gate 44 may be directly used to turn the illumination unit 30 on or off. In this case, the illumination unit 30 of FIGS. 10 and 11 has the same construction as the illumination unit 31 shown in FIG. 5, and the only difference between them is that the detection signal is inputted from the push button PB or the gate 44 rather than the detection unit 40.

Figure 12:
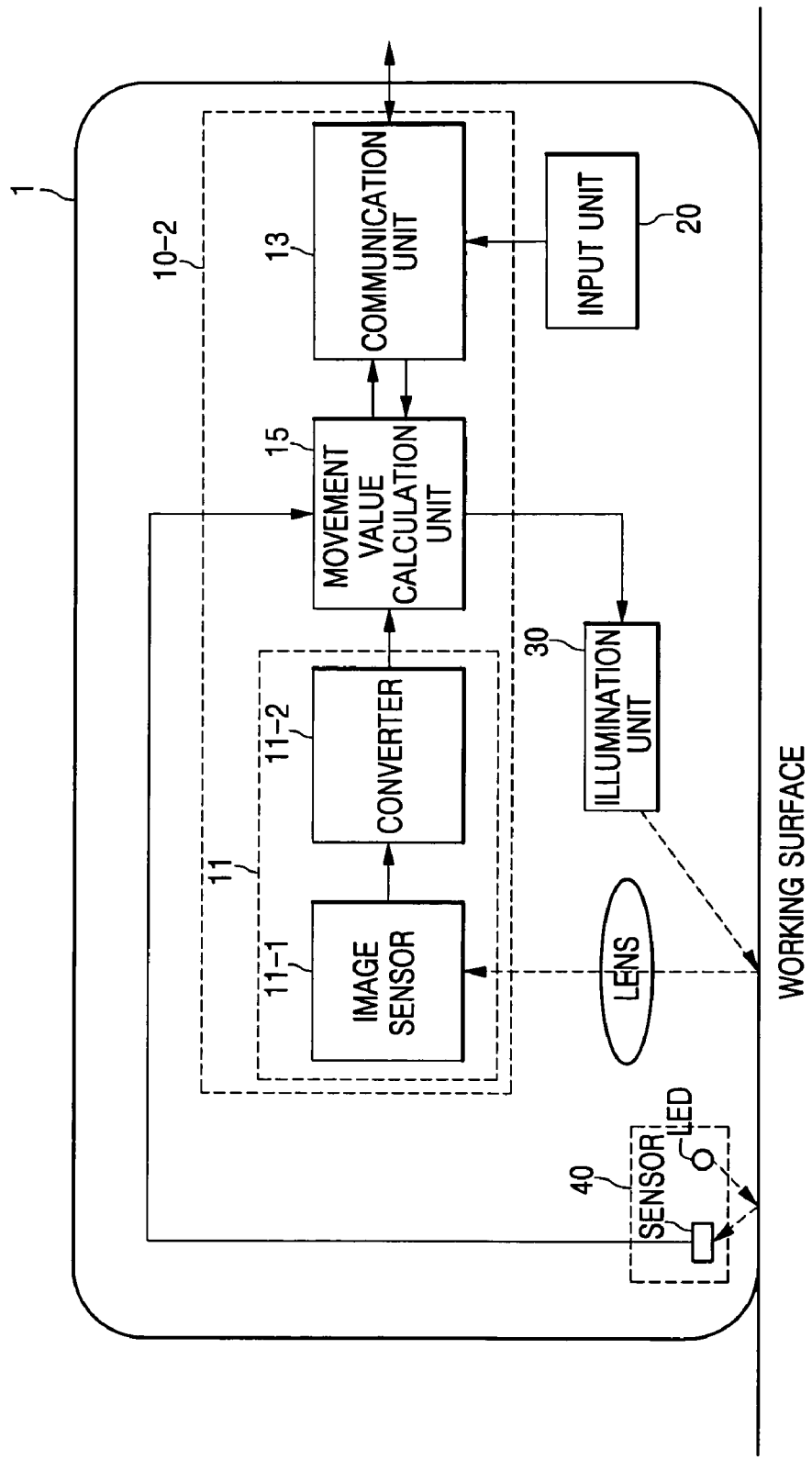
FIG. 12 is a block diagram of an optical mouse according to a fourth embodiment of the present invention.

FIG. 12 is a block diagram showing a block diagram of an optical mouse according to a fourth embodiment of the present invention, including a control unit 10-2, an input unit 20, an illumination unit 30 and a detection unit 40. Here, the control unit 10-2 of FIG. 12 includes an image sensor 11-1, a converter 11-2, a movement value calculation unit 15, and a communication unit 13, and the detection unit 40 includes a sensor and a light emitting diode (LED).

A function of each block shown in FIG. 12 will be described below.

Functions of the image information output unit 11, the communication unit 13, the input unit 20 and the illumination unit 30 are the same as those described in FIG. 1, and a function of the movement value calculation unit 15 is the same as that described in FIG. 10 and a function of the detection unit 40 is the same as the described in FIG. 4.

In other words, the optical mouse according to the fourth embodiment of the present invention shown in FIG. 12 determines whether the optical mouse is on the working surface using the detection unit 40, and thus the movement value calculation unit 15 outputs the illumination signal to turn the illumination unit 30 on or off depending on the determination result.

As described in FIGS. 10 and 11, the detection signal may be inputted to is the communication unit 13, and the communication unit 13 may control the illumination unit 30.

Figure 13:
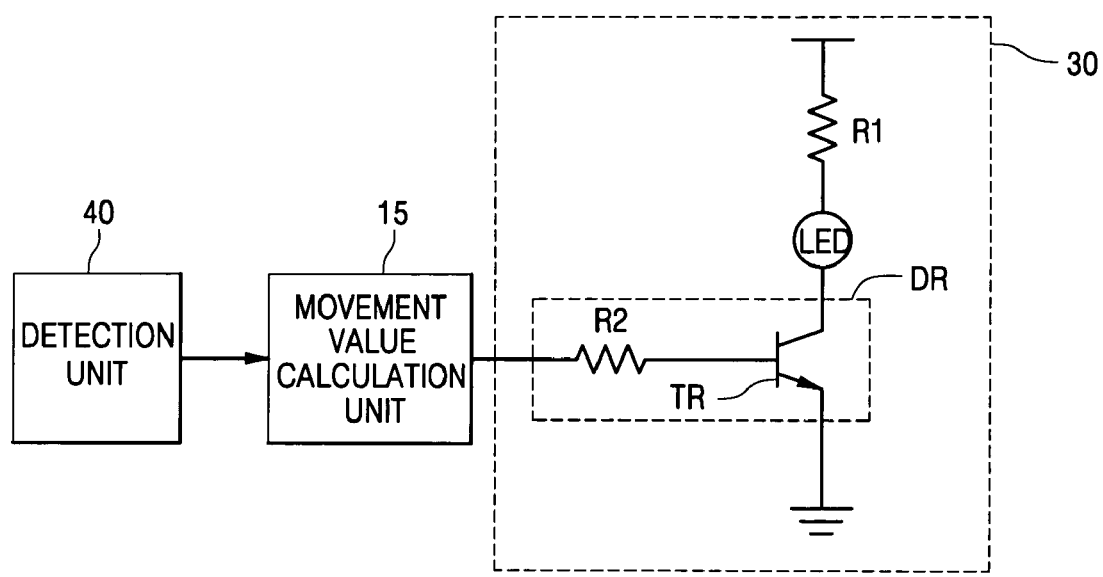
FIG. 13 is a block diagram for explaining operation of an illumination unit of the optical mouse of the present invention shown in FIGS. 10 to 12.

FIG. 13 is a block diagram for explaining operations of the illumination unit 30 in the optical mouse according to the second to fourth embodiments of the present invention shown in FIGS. 10 to 12, in which the illumination unit 30 includes a resistor R1, a light emitting diode LED, and a driving circuit DR, and the driving circuit DR includes a resistor R2 and a transistor TR.

A function and operation of each block shown in FIG. 13 will be described below.

The driving circuit DR turns the light emitting diode LED on or off in response to the illumination signal inputted from the movement value calculation unit 15. When the movement value calculation unit 15 outputs the illumination signal, it outputs the illumination signal with reference to a detection signal inputted from the sensor of the detection unit. The push button PB or the gate 44 may be connected rather than the detection unit 40.

Figure 5:
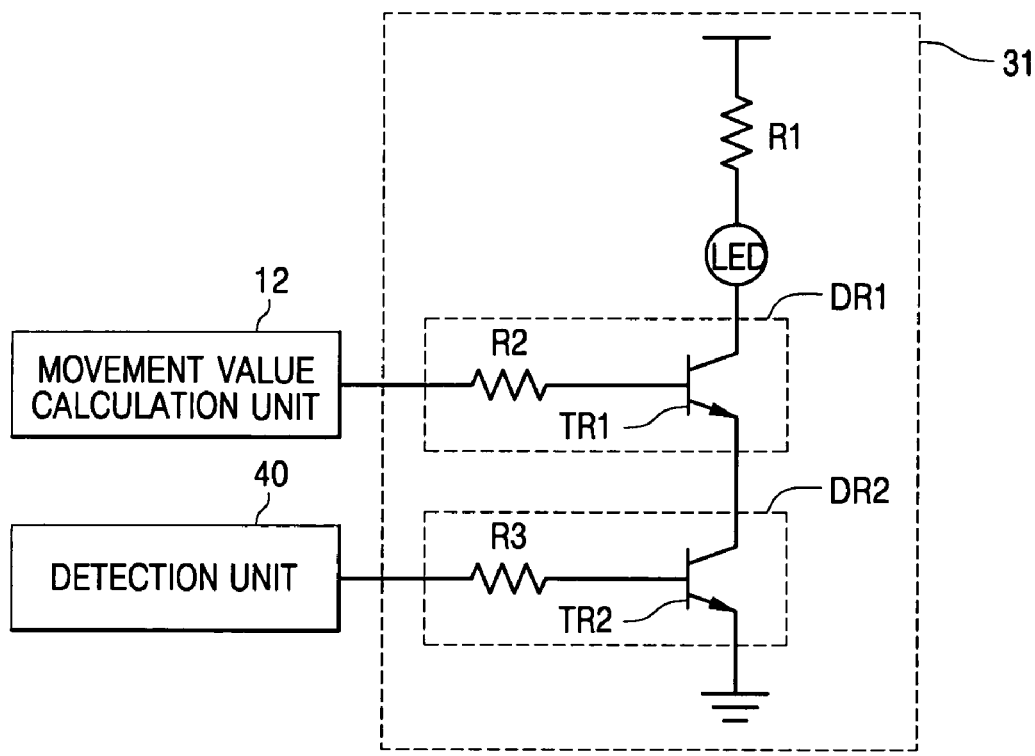
FIG. 5 is a block diagram of an illumination unit of the conventional optical mouse shown in FIG. 4.

In other words, compared with the illumination unit 31 of the conventional optical mouse shown in FIG. 5, only one driving circuit DR is required in the illumination unit 30 of the optical mouse of the present invention, so that the cost is reduced and the circuit is simplified.

In other words, when the optical mouse according to the first to third embodiments of the present invention is turned upside down, the illumination unit 30 or 32 turns off, so that the glaring phenomenon can be minimized and power consumption can be minimized, and a determination will not erroneously made that the optical mouse is on the working surface, due to light inputted from the outside of the optical mouse.

In addition, the optical mouse according to the fourth embodiment of the present invention is turned upside down, the illumination unit 30 or 32 turns off so that the glaring phenomenon can be prevented, and the cost is reduced and the circuit is simplified relative to the conventional optical mouse having a glaring prevention function. In addition, when the optical mouse is separated from the working surface, the illumination circuit 30 turns off so that unnecessary power consumption can be prevented.

Therefore, an optical mouse and a control method thereof according to the present invention can prevent a glaring phenomenon generated when the optical mouse is turned upside down, and unnecessary power consumption can be prevented.

While preferred embodiments of the present invention have been described above, those skilled in the art will appreciate that a variety of modifications and changes can be made without departing from the spirit and scope of the present invention claimed in the following Claims.

What is claimed is:

1. An optical pointing device comprising:
    an illumination unit for illuminating light on a working surface in response to an illumination signal during a calculation period, and generating light in a predetermined code in response to a code signal during a determination period, wherein the code signal repetitively turns on or off the illumination unit depending on a certain code value during the determination period;
    a control unit for outputting the illumination signal to detect an image on the working surface, detecting the image on the working surface to calculate a movement value, and outputting movement information in response to an input signal inputted from the outside and the calculated movement value during the calculation period, intermittently outputting a code generation signal to determine whether or not the optical pointing device is separated from the working surface during the determination period, and turning off the illumination unit when the optical pointing device is separated from the working surface in response to a determination signal; and
    a determination unit for outputting the code signal to determine whether or not the optical pointing device is separated from the working surface in response to the code generation signal, detecting the light, determining whether a code of the detected light matches the predetermined code to thus determine whether or not the optical pointing device is separated from the working surface, and outputting the determination signal depending on the determination result during the determination period,
    wherein the determination period does not overlap with the calculation period, and the light generated during the determination period is different from the light illuminated during the calculation period.

2. The optical pointing device according to claim 1, wherein the control unit comprises:
    an image information output unit for detecting an image on the working surface, and outputting image information on the detected image;
    a movement value calculation unit for outputting the illumination signal and calculating the movement value from the image information during the calculation period, intermittently outputting the code generation signal during the determination period, and turning off the illumination unit when the optical pointing device is separated from the working surface in response to the determination signal; and
    a communication unit for outputting the movement information in response to the calculated movement value and the input signal.

3. The optical pointing device according to claim 2,
    wherein the control unit has an active state in which the movement value is calculated while the illumination unit remains on for most of the time of the calculation period, and the code generation signal is intermittently output, an inactive state in which a determination is made whether or not the optical pointing device moves by intermittently turning on the illumination unit while the illumination unit remains off for most of the time of the calculation period and the code generation signal is intermittently output, and a glaring prevention state in which the code generation signal is intermittently output while the illumination unit remains off during the calculation period; and
    wherein the optical pointing device converts the active or inactive state into the glaring prevention state when the determination is made that the optical pointing device is separated from the working surface.

4. The optical pointing device according to claim 3,
    wherein the control unit further has an idle state in which the illumination unit remains off; and
    wherein the control unit further serves to convert into the idle state when the glaring prevention state continues for a predetermined time.

5. The optical pointing device according to claim 1, wherein the determination unit comprises:
    a code generator for outputting the code signal to turn on or off the illumination unit in response to the code generation signal;
    a detection sensor for receiving light generated from the illumination unit to output a detection signal; and
    a code interpreter for interpreting the detection signal and determining a code of the detection signal matches the predetermined code to determine whether or not the optical pointing device is on the working surface, and outputting the determination signal depending on the determination result.

6. The optical pointing device according to claim 5, wherein the code generator outputs the code signal to turn on the illumination unit for a short time enough for a visually very weak signal to be detected.

7. The optical pointing device according to claim 5, wherein the code generator outputs the code signal to turn on the illumination unit for a visually very weak signal to be detected and the code signal is a pulse signal and a duty cycle of the pulse signal is larger than 50% or smaller than 50%.

8. A method of controlling an optical pointing device, comprising:
    an illumination step that turns on or off an illumination unit to illuminate light on a work surface during a calculation period;
    a calculation step that detects an image on the working surface to calculate a movement value, and outputs movement information during the calculation period, intermittently outputting a code generation signal to determine whether or not the optical pointing device is separated from the working surface during the determination step;
    a code generation step that turns on or off the illumination unit to generate light in a predetermined code in response to a code signal during a determination period, wherein the code signal repetitively turns on or off the illumination unit depending on a certain code value during the determination period;

a determination step that outputs the code signal to determine whether or not the optical pointing device is separated from the working surface in response to the code generation signal, detects light output from the illumination unit to analyze a code included in the light and determines whether the code included in the light matches the predetermined code, to thus determine whether or not the optical pointing device is separated from the working surface and outputs a determination signal depending on the determination result during the determination period; and a glaring prevention step that turns off the illumination unit when the optical pointing device is separated from the working surface in response to the determination signal, wherein the determination period does not overlap with the calculation period, and the light generated during the determination period is different from the light illuminated during the calculation period.

9. The method according to claim 8, wherein the code generation step turns on the illumination unit for a short time enough for a visually very weak signal to be detected.

10. The method according to claim 8, wherein the determination step comprises:

a detection step that receives light generated from the illumination unit to output a detection signal; and an interpretation step that interprets the detection signal and determines a code of the detection signal matches the predetermined code to determine whether or not the optical pointing device is on the working surface, and outputs the determination signal depending on the determination result.

11. The method according to claim 8, wherein the glaring prevention step converts an active state in which the movement value is calculated while the illumination unit remains on for most of the time of the calculation period and the code generation signal is output during the determination period, or an inactive state in which a determination is made whether or not the optical pointing device moves by intermittently turning on the illumination unit while the illumination unit remains off for most of the time of the calculation period and the code generation signal is output during the determination period, into a glaring prevention state in which the code generation signal is output during the determination period while the illumination unit remains off during the calculation period, when the optical pointing device is separated from the working surface, wherein the code generation step turns on or off the illumination unit during the determination period, and wherein the determination step detects light and determines whether the code included in the light matches the predetermined code during the determination period.

12. The method according to claim 11, wherein the glaring prevention step further comprises converting into an idle state in which the illumination unit remains off until a button or a scroll device of the optical pointing device is controlled when the glaring prevention state continues for a predetermined time.

* * * * *